May 16, 1950 L. A. HARDY ET AL 2,508,345
POWER-OPERATED TRACTOR LIFTING DEVICE
Original Filed May 25, 1945 4 Sheets-Sheet 1
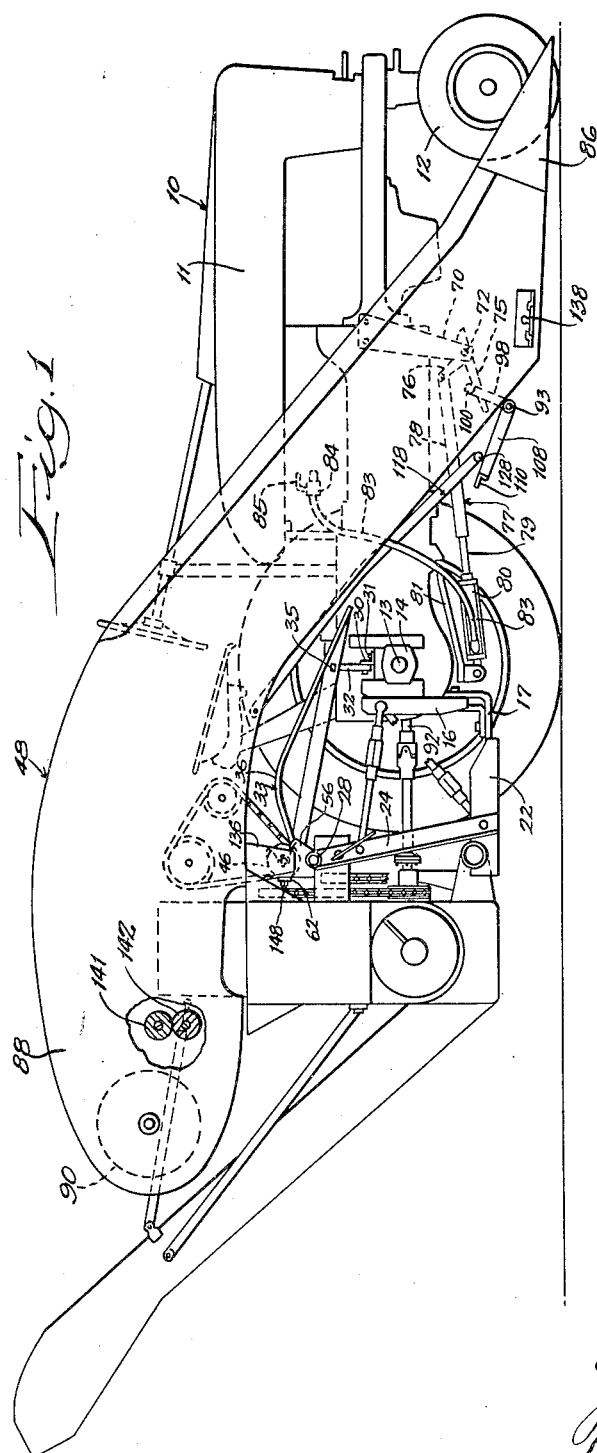
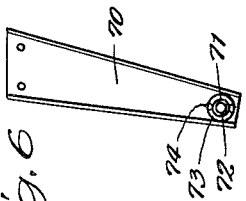
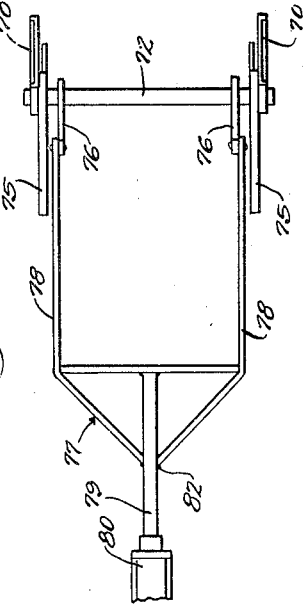
Inventors
Lloyd A. Hardy,
Arthur H. Ketler and
John L. Aasland.
By Paul O. Pippel
Attorney

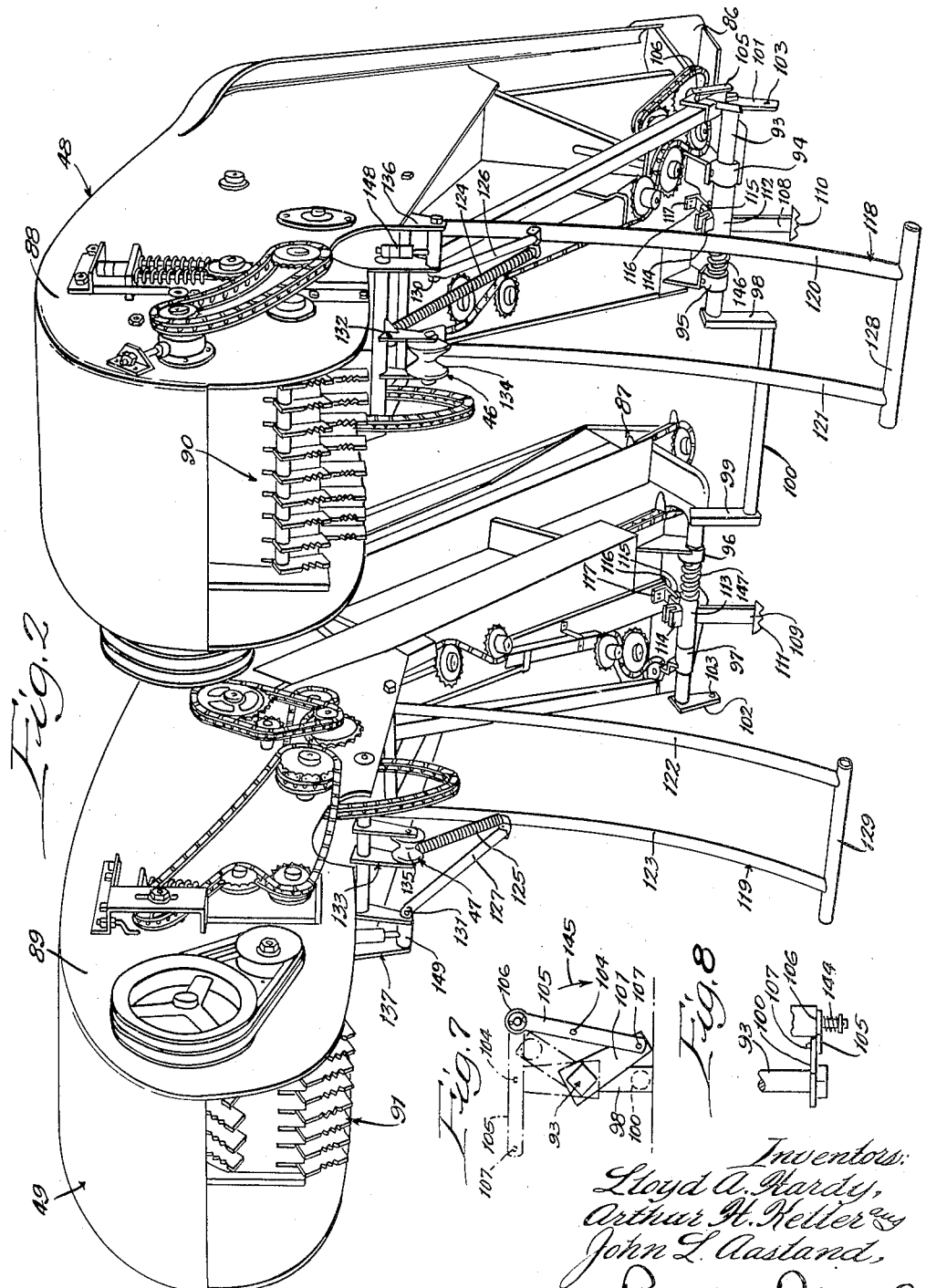

May 16, 1950 L. A. HARDY ET AL 2,508,345
POWER-OPERATED TRACTOR LIFTING DEVICE
Original Filed May 25, 1945 4 Sheets-Sheet 3
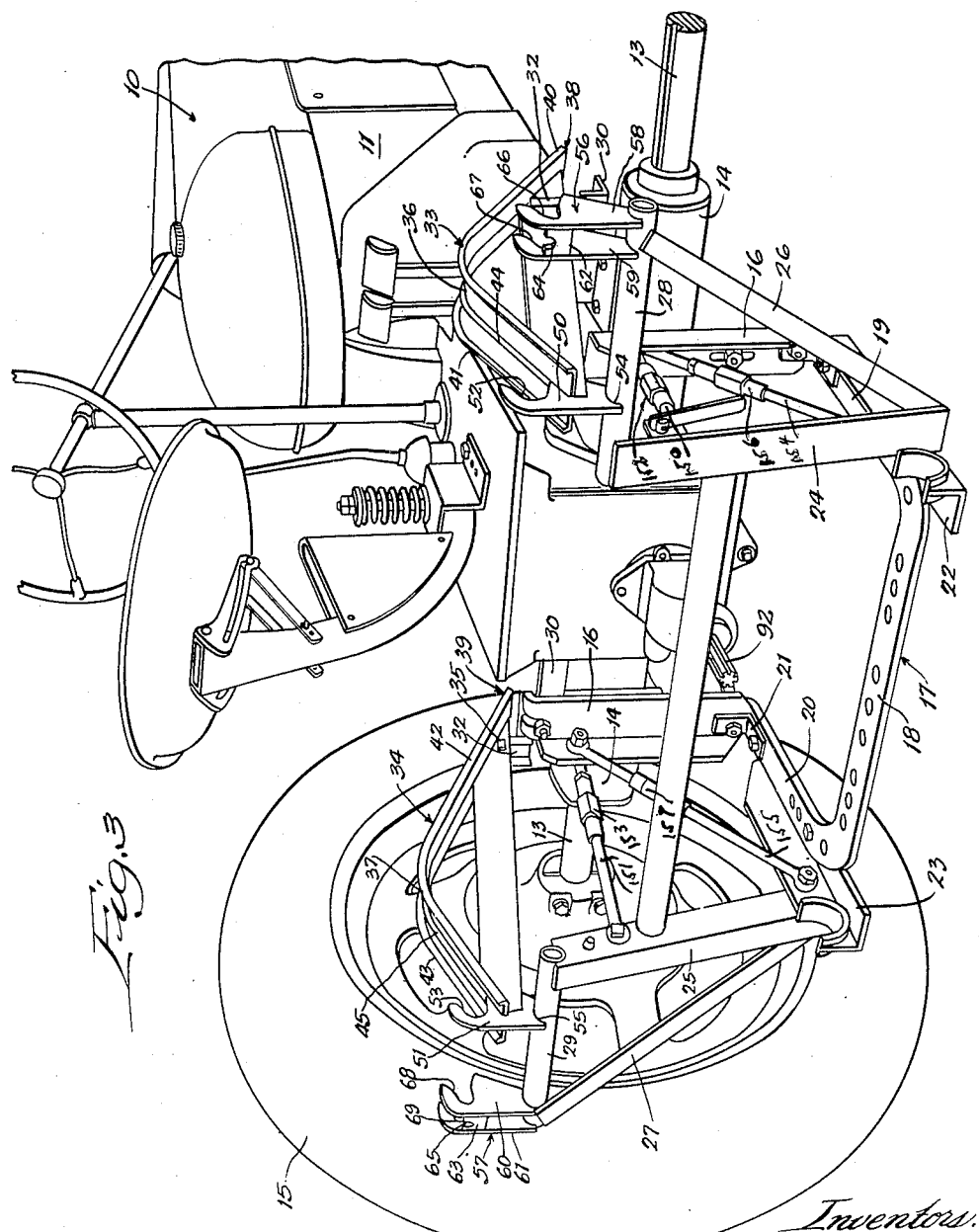

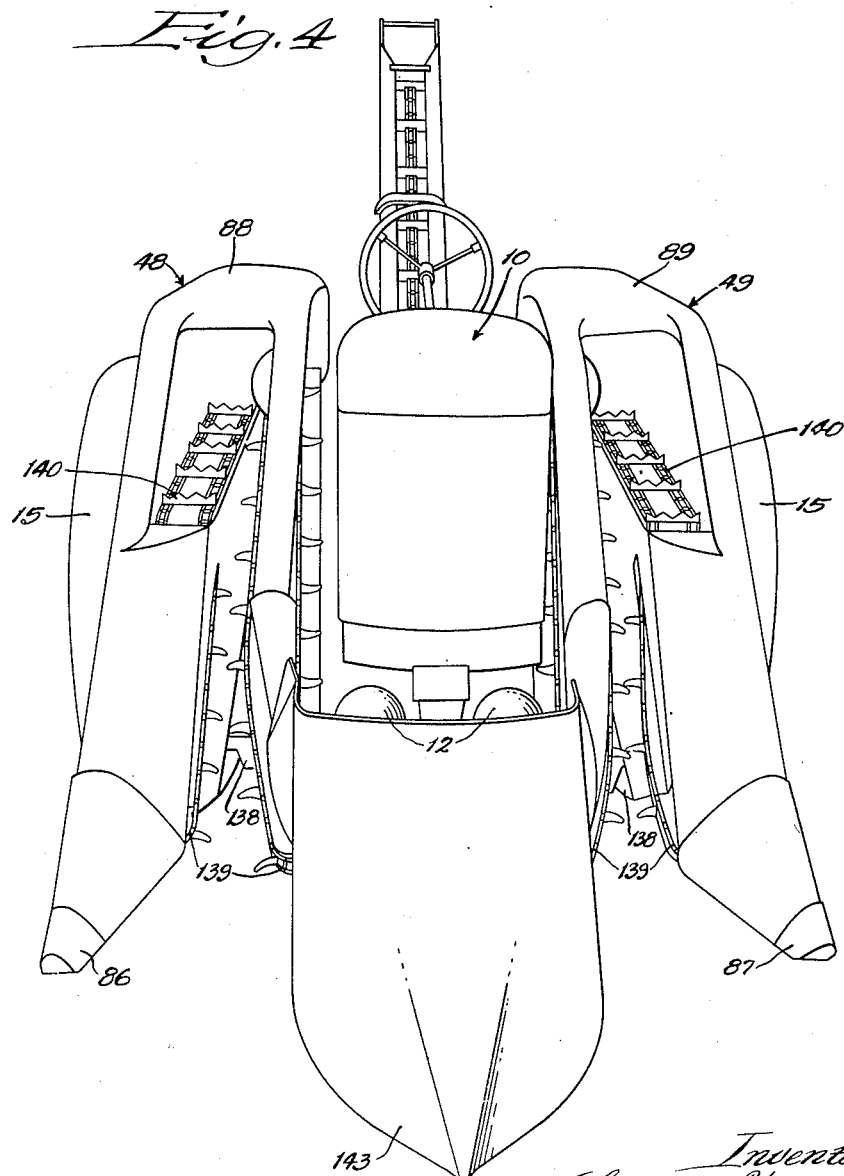

Patented May 16, 1950

2,508,345

UNITED STATES PATENT OFFICE 2,508,345

POWER-OPERATED TRACTOR LIFTING DEVICE

Lloyd A. Hardy, Cambridge, and Arthur H. Keller and John L. Aasland, Moline, Ill., assignors to International Harvester Company, a corporation of New Jersey Original application May 25, 1945, Serial No. 595,788. Divided and this application September 16, 1948, Serial No. 49,554

1 Claim. (Cl. 56—15)

This invention relates to a new and improved tractor mounted agricultural implement and is a division of our parent application having Serial Number 595,788 and filed May 25, 1945.

More particularly this invention relates to the power lifting of implements to a mounted, operating position on a tractor.

An important object of this invention is to provide a quickly attachable and detachable harvesting unit for a tractor.

Another important object of this invention is the provision of power lift means for raising a picker harvester from an inoperative position on the ground to a raised operative position on the tractor.

Heretofore, corn harvesters have been cumbersome machines which required considerable time in attaching to a tractor. The ordinary farmer has but one tractor, and this tractor must be used to operate a number of farm implements and machines, and hence it is imperative that the larger farm machines be readily removable or attachable to the tractor. Further, in times of labor shortage, such as exist at the present time, the farmer does not have available the man-power necessary to mount an enormous corn picker onto a tractor. It is, therefore, an object of the present device to provide a tractor with suitable mounting attachments to cooperate with mounting attachments on a corn picking unit so that one man alone or at the most two men can mount the large corn picking unit to a fixed operating position on the tractor without the expenditure of great effort.

A further important object of this invention is to provide a quick-attachable corn picker on a tractor and to permit pivotal adjustment of the picking unit with respect to the tractor by means of a power-operating tractor-lifting device.

A still further object of the present invention is to provide a two-row corn picking unit capable of standing in upright position and whereby a tractor of the tricycle type having a narrow longitudinal body portion and wide spread rear traction wheels may be driven forwardly between said picking units and having cooperative means associated with both the tractor and the corn picking units to effect a raising of the picker with respect to the tractor and a locking of the same in operative position thereon.

Other and further important objects of this invention will become apparent from the disclosures in the following specification and accompanying drawings, in which:

Figure 1 is a side elevational view of a tractor-mounted corn harvester showing the corn picking units of this invention attached to the tractor;

Figure 2 is a perspective view in larger scale than that of Fig. 1 of the pair of corn picking and gathering units shown in dismounted position from the tractor and viewed from a position rearwardly of the device;

Figure 3 is a perspective view of the tractor, with one wheel removed, to which the corn picking units are attached and shown on a scale substantially the same as that of Figure 2;

Figure 4 is a perspective view of the tractor-mounted corn picker of this invention viewed substantially from the front and on a scale larger than that of Figure 1 but smaller than that of Figures 2 and 3;

Figure 5 is a plan view detail of the tractor power lifting mechanism of this invention shown on a scale somewhat larger than that of Figure 1;

Figure 6 is an end view detail of a portion of the device as shown in Figure 5 and shown on a larger scale than that of Figure 5;

Figure 7 is a side view detail of a leg locking mechanism of the corn picker as shown in Figure 2 and in slightly larger scale; and Figure 8 is an end view of the leg locking mechanism as shown in Figure 7.

As shown in the drawings, the reference numeral 10 indicates generally a farm tractor having a longitudinally extending narrow body portion 11 having a front rolling support having dirigible wheels 12 positioned centrally of said longitudinal body portion 11. The rear end of the narrow body portion is provided with outwardly extending transverse axles 13 around which are mounted axle housings 14. At the outer ends of the axles 13, and spaced from the narrow body portion 11, are attached large traction wheels 15. The tractor is adapted to have normal forward operation with the dirigible wheels at the front and the tractor wheels at the rear.

Vertically positioned angle bars 16 are secured with one face 16a abutting the rear of each axle housing 14. A U-shaped draw-bar 17, having a transverse rear portion 18 positioned rearwardly of the tractor and leg members 19 and 20 extending forwardly toward the tractor, is attached to the lower ends of the angle bars 16 by means of the small angles 21 which are bolted to both the draw-bar 17 and the vertically positioned angle bars 16. Supporting members in the form of angle bars 22 and 23 are rigidly secured to the draw-bar legs 19 and 20, respectively, and extend rearwardly beyond the transverse portion 18 of the draw-bar 17. Vertical supporting members 24 and 25 extend upwardly from the supporting members 22 and 23, respectively, and with the aid of brace members 26 and 27 the upper ends of these vertical support members 24 and 25 each carry alined but spaced apart transverse horizontal pipe sections 28 and 29. These pipe sections 28 and 29 extend laterally outwardly from the upper end of each vertical support 24 and 25, respectively, and are rigidly connected to their respective supports. Connecting rods 150 and 151 having turnbuckles 152 and 153 respectively join the members 24 and 25 to the vertical members 16, and a second pair of connecting rods 154 and 155 also equipped with turnbuckles 156 and 157 extend between the vertical members 16 and the rearwardly extending members 22 and 23. These rods which may be tightened or loosened as desired act to make the mounting structure relatively rigid.

As best shown in Figure 1, a transversely positioned angle bar bracket 30 is secured by cap screws 31 to each of said axle housings 14. Vertical bracket members 32 extend upwardly from the transverse angle brackets 30 and are adapted to support the forward ends of a pair of track structures 33 and 34. Each track structure 33 and 34 is secured to the upper end of the vertical support members 32 at 35 and extends from a point forwardly of the rear tractor axle housings 14 rearwardly over and beyond the axle housings. Reinforcing members 158 and 159 extend beneath and in a horizontal position between the ends of the track and aid in the rigid support of the tracks. The track structures 33 and 34 have a high point at 36 and 37, respectively, which is positioned slightly to the rear of the axle housings, and thereupon the track structures depend downwardly and rearwardly to their rear end connections to the brackets 50 and 51 which are in turn connected to the pipes 28 and 29, respectively. These track structures have a relatively wide forward portion at 38 and 39 and decrease in width as they extend rearwardly. The tracks 33 and 34 are equipped with upwardly extending side flanges 40, 41 and 42, 43. The central portion of the track structures 33 and 34 is equipped with central ridges 44 and 45. The side flanges and the ridges act to strengthen the track structures and to further act as positive guide means for cooperative roller members 46 and 47 which form a part of the corn gathering and picking units 48 and 49. Upwardly extending bracket members 50 and 51 from the pipe sections 28 and 29 are equipped with forwardly projecting open-faced sockets 52 and 53, respectively. These upwardly extending brackets 50 and 51 are rigidly secured to the pipe members 28 and 29 at 54 and 55. Additional socket structures 56 and 57 are mounted on the transverse pipe sections 28 and 29 spaced laterally outwardly from the sockets 52 and 53. These last-named socket structures are formed with upwardly extending laterally spaced plate members 58, 59 and 60, 61. Each of these socket structures has a spacer 62 and 63, repectively, positioned at a point spaced upwardly from the pipe sections 28 and 29 and having upwardly opening notches 64 and 65. Each pair of plates 58, 59 and 60, 61 are cut with forwardly opening sockets 66, 67, 68, and 69 which are in alinement with the forwardly opening sockets 52 and 53 positioned at the rear end of the track structures 33 and 34.

The forward part of the tractor body 11 is equipped with downwardly and rearwardly extending brackets 70 on each side thereof. One of the brackets 70 is shown in detail in Figure 6 and the entire height adjusting mechanism is shown in Figure 5. The lower ends of these brackets have transversely alined openings 71 through which a tubular pipe member 72 is journally rotatable. Washer members 73 are fitted over the ends of the pipe member 72, and cotter pins 74 extending through the pipe 72 are adapted to hold the washer 73 in position against the brackets 70 and prevent endwise movement of the pipe 72. A pair of transversely spaced lifting arms 75 are rigidly connected to the pipe 72 between the depending brackets 70. These lifting arms 75 extend rearwardly and slightly downwardly prior to the corn picker being mounted on the tractor. Adjacent each lifting arm 75 and positioned at substantially right angles thereto are the spaced apart upwardly and rearwardly extending lever arms 76 rigidly connected to the pipe 72. A yoke member 77, having forwardly extending arms 78 pivotally attached to the upper ends of the spaced lever arms 76, is adapted to be reciprocated by the piston 79 of an hydraulic cylinder 80 pivotally attached to the bracket 81 in a substantially central location on the under side of the tractor chassis 11. The piston 79 is rigidly connected to the central portion of the yoke member 77 at 82. The hydraulic cylinder 80 is actuated by fluid under pressure from the tractor 10 through the flexible pipe or hose member 83. A valve 84 is shown in position in the conduit 83 between the tractor fluid supply and the hydraulic cylinder 80. This valve 84 is equipped with an end lever 85 which upon opening will effect an extension of the piston 79 and a corresponding rearward swinging of the lever arms 76 through the action of the yoke arms 78. Inasmuch as both the lever arms 76 and the lifting arms 75 are rigidly attached to the pipe 72, the lifting arms 75 will swing in an arcuate raising movement about the pipe 72 as an axis.

The corn picking units, as shown in Figure 2 of the drawings, are equipped with cooperative elements for ready attachment to the tractor-attaching elements heretofore described. The corn picking units comprise a pair of frame structures, previously designated as 48 and 49, which extend forwardly and downwardly to form gathering points 86 and 87, respectively. Positioned centrally between the picking units is a center divider or stalk pick-up means 143 which is journaled on the tractor wheels 12. The corn picking frame structures have horizontally rearwardly extending portions 88 and 89 from a position at the upper end of the first-named downwardly and forwardly extending portions. Each of the gathering points 86 and 87 is equipped with a stalk-cutting mechanism in the form of a reciprocating cutter bar 138. These gathering points 86 and 87 further include stalk conveying chains 139 and longitudinal conveyers 140 for moving the stalks rearwardly into transversely extending snapping rolls 141 and 142 shown in Figure 1. The rear ends of the gathering units 48 and 49, namely, 88 and 89, house stalk shredding means 90 and 91. The driving means for the elements not shown and the stalk shredding means 90 and 91 are taken from the power take-off 92 of the tractor shown in Figure 3. The driving connection between this power take-off shaft 92 between the tractor 10 and the elements of the gathering units is not shown inasmuch as it does not form a part of this invention.

The front support and mounting structure for the gathering units 48 and 49 includes a transverse pipe 93 extending across both units beneath the forward gathering points 86 and 87. This transverse pipe 93 acts to tie the gathering units together and yet permits passage of the tractor therebetween. Bearing brackets 94 and 95 support the pipe 93 to the under side of the gathering point 86, and bearing brackets 96 and 97, affixed to the under side of the gathering point 87, are adapted to complete the journaling support of the shaft 93. These bearing brackets are shiftable along the length of the pipe 93 to accommodate various spaced corn rows. The pipe member 93 does not run axially across between the gathering points 86 and 87 but is rather offset by a pair of crank arms 98 and 99 and a transverse pipe member 100 extending between the crank arms 98 and 99. Locking arms 101 and 102 are rigidly connected by welding, or the like, to the outer ends of the transverse pipe member 93. Each of these arms 101 and 102 has a hole 103 shown in detail in Figure 7. A manually swingable locking arm 105 is flexibly mounted by means of the spring 144 shown in Figure 8 to the gathering unit 48 at 106 and has a pair of inwardly projecting pins 104 and 107 either of which is engageable with the hole 103 in the locking plate 101. When the pin 107 engages the hole 103, the bail-like member consisting of the pipe extension 100 across the crank arms 98 and 99 will engage the ground as shown in Figure 2 of the drawing. In this position, the front wheels 12 of the tractor are permitted to ride directly over the pipe 100 so that the narrow longitudinal body portion 11 of the tractor 10 would be positioned between the gathering units 48 and 49 in the manner such as shown in Figure 1 of the drawings.

During the mounting operation, it has been found desirable to supply additional ground-engaging elements for the gathering points 86 and 87 in order to more adequately stabilize the picking units. Therefore, supporting legs 108 and 109, having roughened feet portions 110 and 111, respectively, are axially slidable inwardly along the length of the pipe member 93 against the action of springs 146 and 147 and are then rotatable on the pipe. Each of the upper sleeve-like ends 112 and 113 of the leg members 108 and 109, respectively, is equipped with U-shaped bracket members 114 and 115 fixed at some predetermined spaced apart angle. These retractible legs 108 and 109, as shown in Figure 2, are in ground-engaging position, and the U-shaped bracket 115 which forms a unitary part thereof engages a tongue-like extension 116 which is rigidly attached to the under side of the gathering units 48 and 49 at 117. When it is desired to raise these legs out of ground-engaging position, the legs 108 and 109 are slid axially along the pipe 93 against the action of the springs 146 and 147 and rotated so that the U-shaped bracket 114 is in alinement with the tongue portion 116 on the under side of the gathering units, and then a reverse axial sliding of the legs 108 or 109 caused by the force of the springs 146 and 147 will cause an engagement of the tongue 116 with the U-shaped bracket 114, and thereupon the legs 108 and 109 will be held upwardly from a position with respect to the ground. These legs are used to hold the picking unit stationary during mounting and dismounting on the tractor.

After the tractor has been driven into position between the gathering units 48 and 49, the lock arm 105 has its projection 107 removed from the hole 103 in the locking plate 101, after which the pipe 93 may be rotated in a clockwise direction indicated by the arrow 145, as shown in Figure 7, until such time as the pin 104 comes into alinement with the hole 103, whereupon the arm 105 is forced inwardly by the spring 144 so that the pin projection 104 maintains the locking plate 101 non-rotatable. These last-named positions are shown in dashed lines in Figure 7. In this position of the pipe 93, the offset portion 100 extends upwardly and slightly forwardly, as shown in Figure 1, and is adapted to lie on the lifting arms 75 which are directly associated with the hydraulically operated piston and cylinder 79 and 80, respectively. At this point of the mounting procedure, it is desirable that the supporting legs 108 and 109 be shifted axially of their carrying shafts and locked in their uppermost positions by means of the tongues 116 engaging the U-shaped brackets 114.

When the gathering units 48 and 49 are dismounted from the tractor, they are supported in an upright position by the forwardly positioned supporting legs 108 and 109 and ground-engaging rear supports 118 and 119 for each of the units 48 and 49, respectively. Each of these rear supports includes transversely spaced legs 120, 121, and 122, 123 which are pivotally connected in pairs to the underside of the horizontal portions 88 and 89 of the gathering units 48 and 49 on shafts 122ᵃ and 122ᵃ. Springs 124 and 125 are adapted to urge the ground-engaging supports 118 and 119 rearwardly. Telescopic stop members 126 and 127 are positioned between the legs 120 and 123 and the under side of the gathering units 48 and 49, respectively. These ground-engaging supports 118 and 119 have their dual legs 120, 121 and 122, 123 joined by transverse feet members 128 and 129, respectively. The attachment of the telescopic units 126 and 127 at 130 and 131 to the under side of the gathering units 48 and 49 are at points rearwardly of the pivotal attachment of the leg member 120, 121, 122, and 123. When the gathering units 48 and 49 are being mounted on the tractor 10, the rear support members 118 and 119 are automatically swung forwardly about their pivotal connections on the under side of the horizontal portions 88 and 89 of the gathering units 48 and 49 by the tractor axle 13 and axle housing 14. During this operation the telescopic members 124 and 126 are fully extended. In this position of the rear legs, the front positioned legs 108 and 109 are adapted to support the transversely extending feet 128 and 129 of the rear legs as shown in Figure 1. In order that the rear supporting leg members 118 and 119 may be swung forwardly, the action of the springs 124 and 125 must be overcome and the telescopic stop members 126 and 127 are readily extensible. The function of these telescopic stop members is to prevent the springs 124 and 125 from pulling the rear supports 118 and 119 upwardly to the rear and out of ground-engaging position. As shown in Figure 2, the telescopic stop members 126 and 127 act as rigid links and firmly support the members 118 and 119 in their downwardly and rearwardly inclined positions.

During removal of the tractor from the corn picking units, the front legs 108 and 109 are dropped to ground-engaging position such as shown in Figure 2. It is apparent that the rear legs will drop and will be pulled rearwardly by the springs 124 and 125. The legs 118 and 119 will then rest against the rear axle housing 14 of the tractor. As the tractor is backed out of position with respect to the corn picker the rear legs will swing back as the removal of the axle housing 14 permits. The rear limiting position of the legs will, of course, be reached when the telescopic units 126 and 127 have reached their collapsed position. At this time, the picker is capable of standing on its own legs.

The rear mounting structure includes transversely spaced pairs of brackets 132 and 133 depending from a forward part of the horizontal portions 88 and 89 of the gathering units. The pairs of brackets 132 and 133 each support grooved rollers 46 and 47, respectively. These grooved rollers are adapted to engage or slide upon the track members 33 and 34 positioned upon the tractor 10. The side flanges 40, 41 and 42, 43 and the ridge centers 44 and 45 maintain these rollers 46 and 47 in a central position on the tracks 33 and 34. The forwardly opening sockets 52 and 53 are adapted to receive the central grooves 134 and 135 of the rollers 46 and 47. The forward portions 38 and 39 of the tracks 33 and 34 are somewhat lower than the rear portions, and hence when the tractor is driven into the standing gathering units, as shown in Figure 2, the rollers 46 and 47 ride upwardly on the tracks 33 and 34 and thereupon the gathering units are lifted onto the tractor. Additional pairs of brackets 136 and 137 are spaced outwardly but in axial alinement with the brackets 132 and 133. Each of these outwardly spaced pairs of brackets support T-bolts 148 and 149 having their head portions pivoted between these depending brackets 136 and 137 which are adapted to fit into the forwardly opening sockets 66, 67, and 68, 69. When the rollers 46 and 47 are within the sockets 52 and 53 and the T-bolt heads are within the outer sockets, the T-bolts 148 and 149 are swung into the locking notches 64 and 65 provided on the socket structures 56 and 57. It is quite evident that the gathering units 48 and 49 are pivotally mounted as an entire unit in axial alinement with the T-bolt heads 148 and 149 and the grooved rollers 46 and 47, and hence the lifting of the gathering points 86 and 87 by a raising of the lifting arm 75 by actuation of the hydraulic cylinder 80 will effect a tilting of the gathering units about the axial hinge through the rollers 46 and 47.

It is apparent that herein is provided a novel attachment for a corn picking unit to a tractor which has been shown in a preferred embodiment, and applicant intends that the claims of his invention shall include all similar constructions and modifications coming within the scope of the appended claim.

What is claimed is:

In a tractor having power lift means including a hydraulic cylinder hingedly mounted at the rear and underside of the tractor for vertical swinging movement, a reciprocable piston extending forwardly from said hydraulic cylinder, brackets depending from each side of the tractor intermediate the front and rear thereof, a transverse pipe journaled in said depending brackets, a first pair of crank arms fixed to said pipe and hingedly connected to said piston, a second pair of crank arms fixed to said pipe and disposed at an angle with respect to said first pair of crank arms, a corn picking unit pivotally attached at the rear of said tractor and inclined forwardly and downwardly therefrom, and a transverse member positioned on the forward and underside of said corn picking unit, said transverse member having a bail-like central portion adapted to be engaged by said second pair of crank arms, whereby extension movement of said piston from the hydraulic cylinder causes upward or downward movement of the corn picking unit.

LLOYD A. HARDY.
ARTHUR H. KELLER.
JOHN L. AASLAND.

REFERENCES CITED

The following references are of record in the file of this patent:

UNITED STATES PATENTS

| Number | Name | Date |
| --- | --- | --- |
| 2,259,892 | Hyman | Oct. 21, 1941 |
| 2,376,539 | Hitchcock et al. | June 10, 1943 |
| 2,376,541 | Johnson et al. | May 22, 1945 |
| 2,401,183 | Pool et al. | May 28, 1946 |